United States Patent
Burton et al.

(10) Patent No.: US 7,209,963 B2
(45) Date of Patent: Apr. 24, 2007

(54) APPARATUS AND METHOD FOR DISTRIBUTED MONITORING OF ENDPOINTS IN A MANAGEMENT REGION

(75) Inventors: Toby L. Burton, Austin, TX (US); Rhonda L. Childress, Austin, TX (US); Prabhakar Gopalan, Austin, TX (US); Kenneth Willard Lott, Lawrenceville, GA (US)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 10/195,157

(22) Filed: Jul. 11, 2002

(65) Prior Publication Data

US 2004/0010586 A1   Jan. 15, 2004

(51) Int. Cl.
*G06F 15/13* (2006.01)
(52) U.S. Cl. .......................... 709/223; 709/224; 710/15
(58) Field of Classification Search ............... 709/223, 709/224; 710/15
See application file for complete search history.

(56) References Cited

U.S. PATENT DOCUMENTS

| | | | | |
|---|---|---|---|---|
| 5,710,885 A | * | 1/1998 | Bondi | 709/224 |
| 5,754,763 A | | 5/1998 | Bereiter | 395/187.01 |
| 6,049,828 A | * | 4/2000 | Dev et al. | 709/224 |
| 6,061,725 A | | 5/2000 | Schwaller et al. | 709/224 |
| 6,061,807 A | | 5/2000 | Albert et al. | 714/3 |
| 6,122,664 A | | 9/2000 | Boukobza et al. | |
| 6,181,697 B1 | | 1/2001 | Nurenberg et al. | 370/390 |
| 6,259,701 B1 | | 7/2001 | Shur et al. | 370/401 |
| 6,418,469 B1 | * | 7/2002 | Justice et al. | 709/224 |
| 6,731,832 B2 | | 5/2004 | Alvarez et al. | |
| 6,973,229 B1 | | 12/2005 | Tzathas et al. | |
| 2002/0091815 A1 | * | 7/2002 | Anderson et al. | 709/223 |
| 2002/0112040 A1 | * | 8/2002 | Chang et al. | 709/223 |
| 2003/0069953 A1 | * | 4/2003 | Bottom et al. | 709/223 |
| 2003/0097496 A1 | * | 5/2003 | Gabryjelski | 710/15 |
| 2003/0221004 A1 | * | 11/2003 | Stupek et al. | 709/224 |

OTHER PUBLICATIONS

Childress et al., Apparatus and Methods for Monitoring the Health of Systems Management Software Components in an Enterprise, no date.

* cited by examiner

*Primary Examiner*—Viet D. Vu
*Assistant Examiner*—Jinsong Hu
(74) *Attorney, Agent, or Firm*—Duke W. Yee; David A. Mims, Jr.; Lisa L. B. Yociss

(57) ABSTRACT

An apparatus and Method for distributed monitoring of endpoint devices using gateway servers is provided. With this apparatus and method, a healthcheck engine is provided on each of the gateway servers having endpoint devices that are to be monitored. The healthcheck engine periodically or continuously sends requests to the endpoint devices that they respond with a hostname transmitted to them. If the endpoint responds, a list of monitored endpoints is updated with a new timestamp indicating the time when the response was received. If a response is not received, a determination is made as to whether one or more time thresholds has been exceeded. If so, a Tivoli Enterprise Console event corresponding to the particular threshold exceeded, is sent to the TEC server.

30 Claims, 6 Drawing Sheets

APPARATUS AND METHOD FOR DISTRIBUTED MONITORING OF ENDPOINTS IN A MANAGEMENT REGION

RELATED APPLICATIONS

This application is related to commonly assigned and co-pending U.S. patent application Ser. No. 10/195,155 entitled "Apparatus and Method for Monitoring the Health of Systems Management Software Components in an Enterprise," filed on even date herewith, currently pending, and hereby incorporated by reference.

BACKGROUND OF THE INVENTION

1. Technical Field

The present invention is generally directed to an improved computing system. More specifically, the present invention is directed to an apparatus and method for monitoring the health of systems management software components in an enterprise.

2. Description of Related Art

The management of heterogeneous distributed computer systems is a complex task that can involve various operating systems, distributed network services and system management tasks. International Business Machines, Inc. has created a system for centralized control of a distributed environment, which can include mainframes, UNIX or NT workstations, personal computers, and the like. This system is known as the Tivoli Management Environment of which, the Tivoli Management Framework is the base component on which Tivoli applications are built for management of distributed computing systems. Information about the Tivoli Management Environment and Tivoli Management Framework can be obtained from the Tivoli web site at http://www.tivoli.com/support/public/Prodman/public_manuals/td/ManagementFramework3.7.1.html, for example.

The Tivoli Management Environment (TME) framework provides the foundation for managing resources in a distributed environment. The TME framework provides a set of system management services that enable a user to install both the framework and selected applications on multiple heterogeneous systems. Once installed and configured, the framework provides a robust foundation for managing TME resources, policies and policy regions.

A resource, or managed resource, as the term is used in the present application, is any hardware or software entity (machine, service, system or facility) that is represented by a database object. Managed resources are subject to a set of rules and must be a supported resource type in a policy region. Managed resources include, but are not limited to, managed nodes, task libraries (a container in which an administrator may create and store tasks and jobs), profiles (a container for application-specific information about a particular type of resource), profile managers (a container that holds profiles and that links a profile to a set of resources, called "subscribers"), monitors (a program that resides in the endpoint (workstation which has the Tivoli Management Agent program running in it), and performs the task of monitoring a resource/program—e.g. disk space, process, memory etc.), bulletin boards (a mechanism to which notices may be posted so that the framework and applications may communicate with the human administrator), workstations, software, and the like.

A policy is a set of rules that is applied to managed resources. A specific rule in a policy is referred to as a policy method. An example of a policy is that all user accounts must have passwords, and password aging must be enabled. These rules may take the form of software, shell scripts, written procedures and guidelines, and the like.

A policy region is a group of managed resources that share one or more common policies. Policy regions are used to model the management and organizational structure of a network computing environment. The policy region contains resource types and a list of resources to be managed.

The TME framework, in its most basic sense, is comprised of one or more Tivoli Management Region (TMR) servers and one or more managed nodes. A TMR server is a server that holds or references a complete set of software, including the full object database, for a Tivoli management region. A Tivoli management region is defined as a Tivoli management region server and its associated managed nodes. The TMR server includes the libraries, binaries, data files, and graphical user interfaces needed to install and manage a TME. The TMR server maintains the TMR server database and coordinates all communications with TME managed nodes. The TMR server also performs all authentication and verification necessary to ensure the security of TME data.

A TME managed node runs the same software that runs on a TMR server. Managed nodes maintain their own databases, which can be accessed by the TMR server. When managed nodes communicate directly with other managed nodes, they perform the same communication and/or security operations performed by the TMR server. The primary difference between a TMR server and a managed node is the size of the database maintained.

One configuration of a TME framework requires a two-tiered approach: TMR servers communicating with managed nodes or personal computer managed nodes. FIG. 1A illustrates such a configuration. As shown in FIG. 1A, a single TMR server 110 manages the resources of managed nodes 120–140 which also manage their own resources. Thus, the TMR server 110 will maintain a database relating to each of the managed nodes 120–140, and the managed nodes 120–140 will maintain a database relating to their own respective resources.

With such a configuration, operations on each client device, or endpoint, of each managed node 120–140 required a call to the TMR server 110 to update information on the server database. For a large installation, this communication load is substantial. Additionally, operating system imposed limits on the number of clients a system can communication with at one time limits the size of a Tivoli Managed Region (TMR) to no more than approximately 200 clients.

In another configuration, as shown in FIG. 1B, a three-tiered approach is taken. In this configuration, a TMR server 150 is coupled to gateways 160 and 170, and a managed node 180. With the reduced number of managed nodes in the TMR, the amount of communication with the TMR server is significantly reduced. Endpoints 175, or clients, do not communicate with the TMR server 150, except during the initial login process. All endpoint 175 communications go through the gateway 170. In most cases, the gateway 170 will provide all of the support an endpoint needs without requiring communication with the TMR server 150. In a smaller workgroup-size installation, the gateway 170 may be created on the TMR server 150.

The TME framework provides the ability to subdivide an enterprise network into multiple TMRs, and then to connect them with either one or two-way connections. Installations composed of managed nodes and personal computer managed nodes often require multiple TMRs for a variety of reasons. Installations using endpoints and endpoint gateways rarely need more than one TMR.

While the Tivoli Management Environment (TME) monitors many aspects of system and network operations, it does not provide a mechanism to monitor itself. Thus, while the TME may be able to handle problems with various components of the systems and networks, errors or failures of the TME itself will not be identified and appropriate corrective action may not be performed until some other dependent component fails. Therefore, it would be beneficial to have an apparatus and method that monitors the health of systems management software components, such as components of the TME, in an enterprise.

SUMMARY OF THE INVENTION

The present invention provides an apparatus and method for monitoring the health of system management software components in an enterprise. With the present invention, a health monitoring agent is installed on a TMR server and is then distributed to managed nodes using a Software Distribution TME component. The health monitoring agent on each of the managed nodes is then configured based on the particular TME components installed on the particular managed node.

Thereafter, to enable the healthchecking on the managed node module software on each managed node, the healthchecking software is distributed to the respective managed nodes via Tivoli Profiles. After basic setup operation on the individual managed nodes for the healthchecking software (which includes adding the healthcheck.pl program as a cron job [a cron job is a program in UNIX that is executed by the Operating System at pre-set time intervals]), the healthchecking programs are run on the managed nodes. The agents then run each of their enabled healthcheck modules to determine the health of their system management components and the health of the TMR from their point of view. If an error occurs during the health check, the error is logged into a log file associated with the particular healthcheck module and the managed node. In addition, based on the return code returned from the healthcheck module, the health monitoring agent on the managed node may return an event to the TEC server in order to notify a system administrator of the error.

In addition to monitoring the managed nodes of a Tivoli Management Region, the present invention provides a mechanism for distributed monitoring of endpoint devices using gateway servers. With this mechanism of the present invention, a healthcheck engine is provided on each of the gateway servers having endpoint devices that are to be monitored. The healthcheck engine periodically or continuously sends requests to the endpoint devices that they respond with a hostname transmitted to them. If the endpoint responds, a list of monitored endpoints is updated with a new timestamp indicating the time when the response was received. If a response is not received, a determination is made as to whether one or more time thresholds has been exceeded. If so, a Tivoli Enterprise Console event corresponding to the particular threshold exceeded, is sent to the TEC server.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides an apparatus and method for monitoring the health of system management software components of an enterprise. The present invention may be implemented in any distributed computing system in which resource management servers are utilized to manage resources for a managed region of the distributed computing environment. In a preferred embodiment, the present invention is implemented in a Tivoli Management Environment in which a Tivoli framework is utilized upon which Tivoli applications are run. Such a Tivoli Management Environment may be comprised of one or more Tivoli Managed Regions (TMRs) comprised of a TMR server, one or more managed nodes, and one or more endpoints.

Figure 1A:
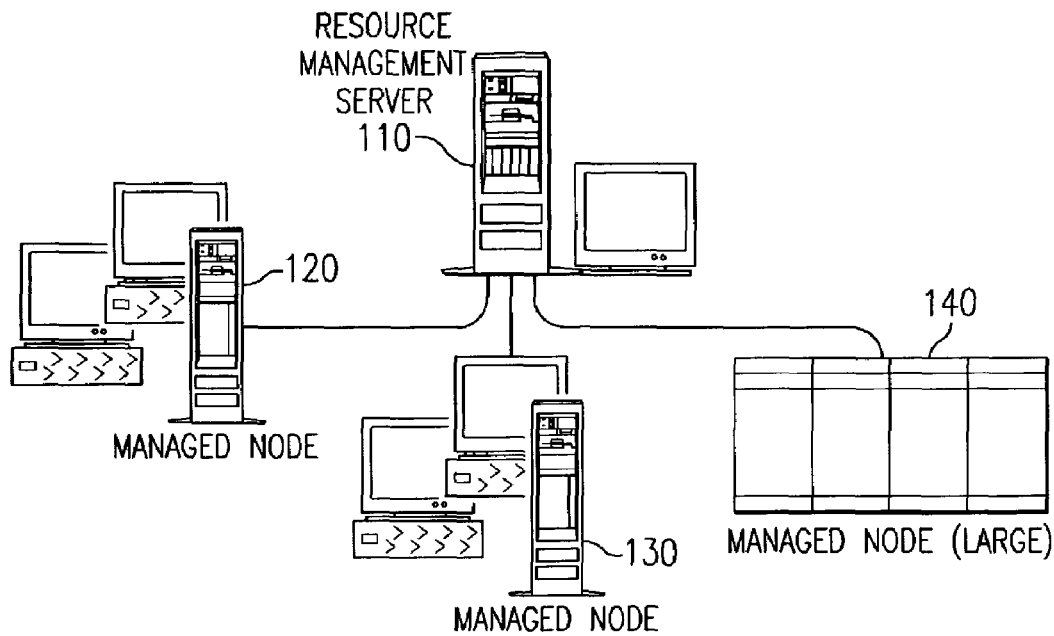
FIG. 1A is an exemplary block diagram of a resource management system according to a first type.
Figure 1B:
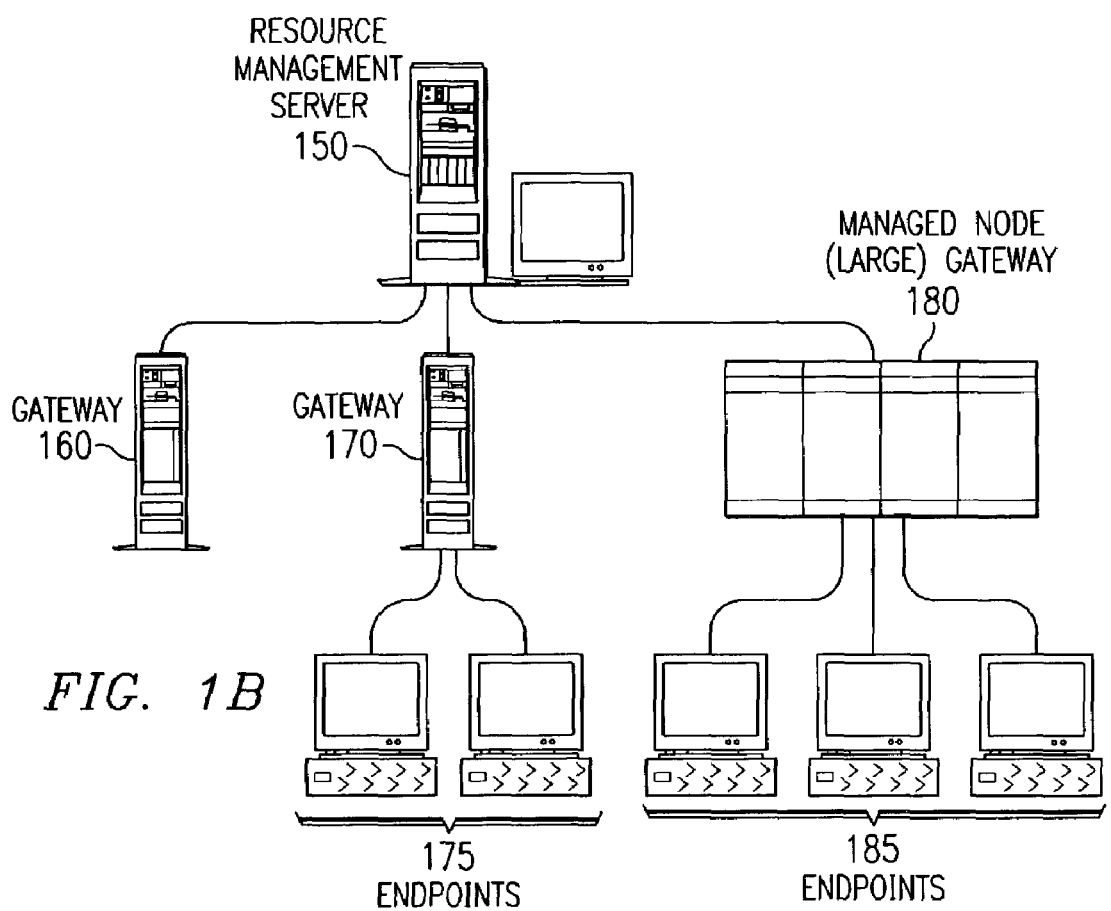
FIG. 1B is an exemplary block diagram of a resource management system according to a second type.

The present invention, according to the preferred embodiment, may be used with TMRs of either type shown in FIGS. 1A and 1B. In a preferred embodiment, however, the TMRs take the form shown in FIG. 1B since this configuration minimizes the amount of communication between the endpoints and the resource management server.

Figure 2:
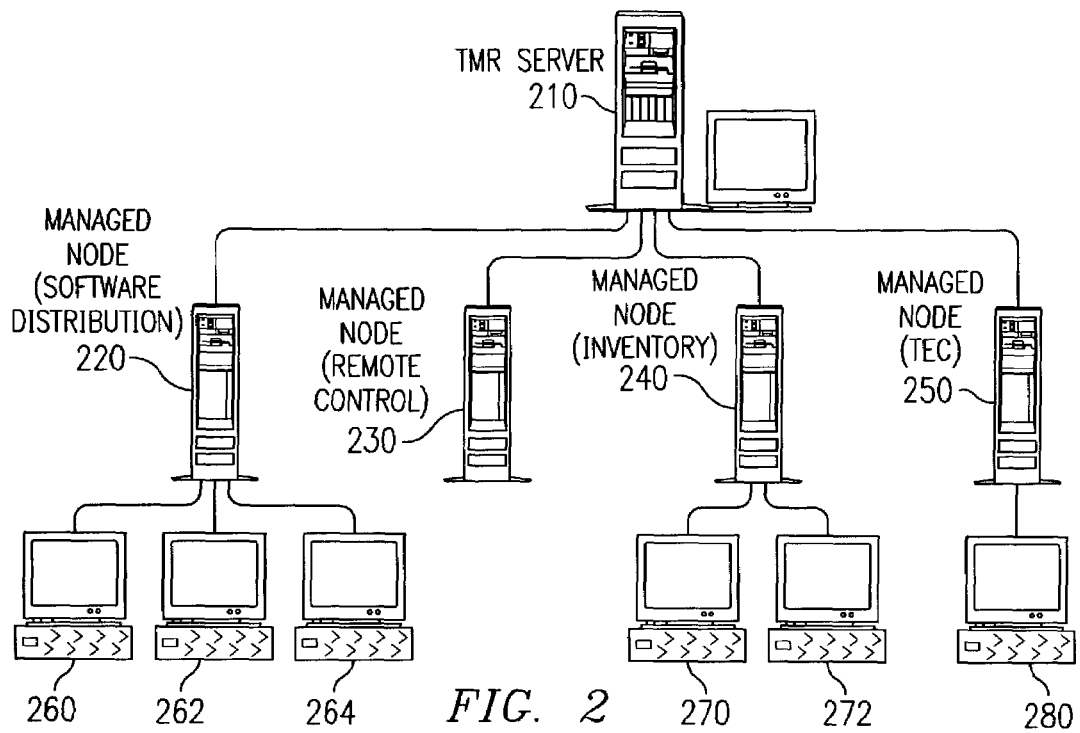
FIG. 2 is an exemplary diagram of a system management suite in accordance with the present invention.

FIG. 2 is an exemplary diagram of a system management suite in accordance with the present invention. As shown in FIG. 2, the Tivoli Management Region Server (TMR server) 210 is the central and hierarchical head that manages all systems below it in the hierarchy. The TMR server 210 represents a first tier in the Tivoli Management Environment (TME) hierarchy.

The managed nodes 220–250 are second tier systems that have systems management components of the systems management software which perform one or more of a plurality of different system management functions. These system management functions include, for example, software distribution, distributed monitoring, remote control, inventory, event management console, and the like.

A third tier of the TME hierarchy is populated by the endpoint devices 260–280. The endpoint devices 260–280 are the devices having resources that are to be managed by the TMR server 210 and the managed nodes 220–250 of the first and second tiers. The endpoint devices 260–280 preferably include software components called Tivoli Management Agents which are software programs that perform administrative operations in accordance with the TME framework to manage the resources on the endpoint, send and receive information to and from the managed nodes 220–250 and the TMR server 210, install new software components, handle profiles provided to it by the managed nodes 220–250, and the like.

With the present invention, health monitoring agents are installed on each of the managed nodes 220–250 whose activity is to be monitored and health monitoring modules of these health monitoring agents are configured based on the particular software management functions performed by the managed node 220–250. These health monitoring modules are also configured to report any changes in the status of monitored activity to an event management console, such as the Tivoli Enterprise Console (TEC), and to also log such changes in a log file for the activities being monitored.

The systems management software's software distribution capability, for example, may be used to distribute and install the health monitoring agents on each of the managed nodes 220–250. The health monitoring agents are then configured for use in monitoring activity of the particular managed node 220–250.

The health monitoring agents are configured on each of the managed nodes to monitor activity of the managed nodes and to report changes in the activity to both an event management console and a log by enabling individual modules in the health monitoring agent that run as background processes which monitor the health of the system management components resident on the managed nodes in a variety of ways, depending on the particular systems management function or functions performed by that managed node.

These health monitoring modules, hereafter referred to as healthcheck modules, are then implemented using the health monitoring agents to monitor the health of the systems management components. These healthcheck modules include, for example, an object request broker service (such as the oserv service on the TMR server and the managed nodes) healthcheck module, a healthcheck module that monitors the Internet Protocol connection, oserv-to-oserv connection, and the connection between two or more interconnected TMR servers, a TEC server healthcheck module, an endpoint gateway healthcheck module, a Global Enterprise Manager (GEM) server healthcheck module, a Software Distribution Gateway healthcheck module, an Inventory Gateway healthcheck module, and a Remote Control server healthcheck module. Other healthcheck modules may be used in addition to, or in replacement of, one or more of the above healthcheck modules without out departing from the spirit and scope of the present invention.

In one preferred embodiment of the present invention, a main program in the TMR server initiates a healthcheck on each of the managed nodes. In each of the managed nodes, the health monitoring agents check each of the healthcheck modules in the order listed above. If an error is found by the object request broker service healthcheck module, no further processing is done. A TEC event is sent to the primary TEC server so that the event may be used to generate a notification to a system administrator. If the sending of the TEC event to the primary TEC server fails, then the TEC event is sent to a secondary TEC server.

If the object request broker service is operational, the present invention continues to perform checks in the order above, for the various TME system management components (TME components) installed on the particular managed nodes. The particular components checked by the healthcheck modules will depend on the TME components installed on the particular managed node. Depending on the particular error code returned by one or more of these healthcheck modules, the present invention will or will not send TEC events to the TEC server. However, if an error is identified, a log entry in a corresponding log file will be generated, whether or not a TEC event is sent to the TEC server.

Log files of the present invention are maintained in a predetermined directory on the managed nodes. Generally the log files only contain adverse event information obtained from errors identified by the healthcheck modules. However a debug option may be selected that causes the log file to store debug information regarding the various TME components.

The above description is a general overview of the present invention. More detailed description of the installation, configuration, and operation of the healthcheck modules will now be provided.

Figure 3:
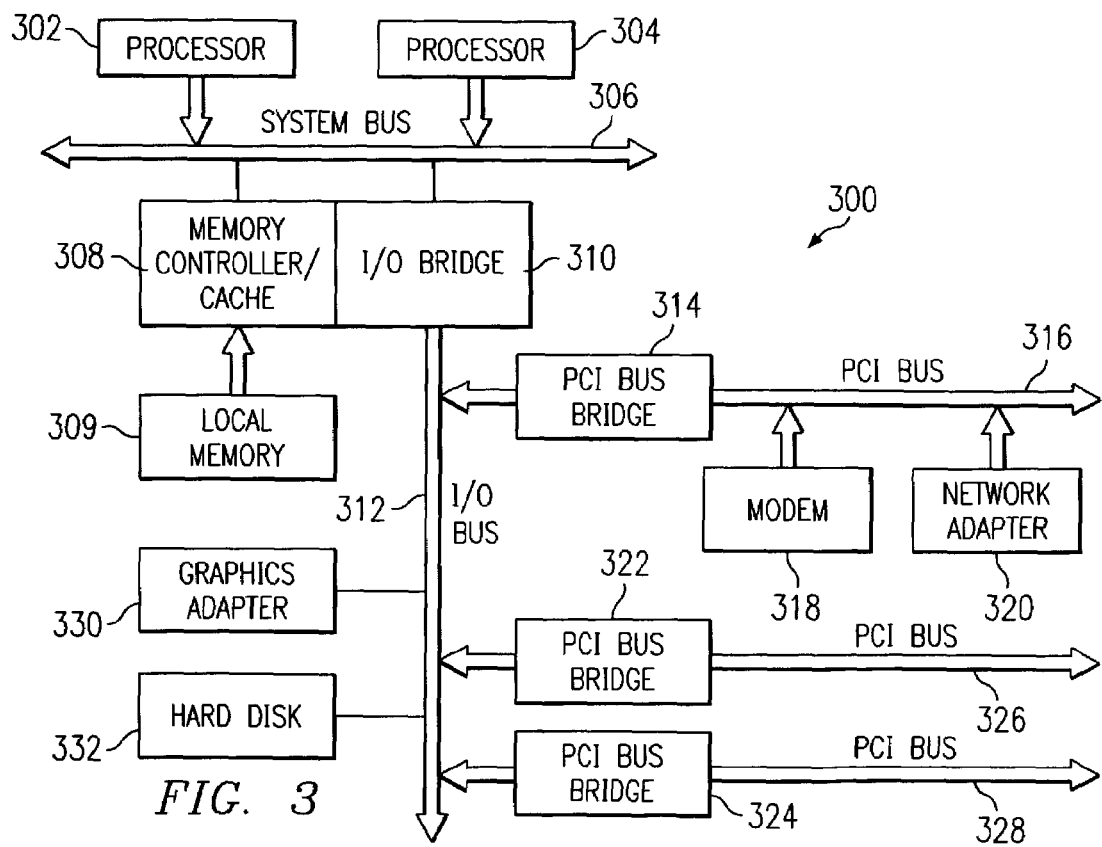
FIG. 3 is an exemplary block diagram of a resource management server in accordance with the present invention.

As noted above, the present invention is preferably implemented on the TMR server and one or more managed nodes. In a preferred embodiment, the TMR server and the managed nodes are server computing devices. FIG. 3 is an exemplary block diagram of a server, such as the TMR server 210 or the managed nodes 220–250, in accordance with the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to managed nodes and gateways in FIG. 2 may be provided through network adapter 320 connected to PCI local bus 316 through add-in boards. Additional PCI bus bridges 322 and 324 provide interfaces for additional PCI local buses 326 and 328, from which additional network adapters may be supported. In this manner, data processing system 300 allows connections to multiple network computers and devices. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer pSeries system, a product of International Business Machines Corporation in Armonk, N.Y., running the Advanced Interactive Executive (AIX) operating system or LINUX operating system.

The managed nodes of the present invention are used to manage the resources of the endpoint devices. As discussed in greater detail hereafter, one aspect of the present invention is the distributed monitoring of endpoints. First, a brief description of a typical endpoint will be provided.

Figure 4:
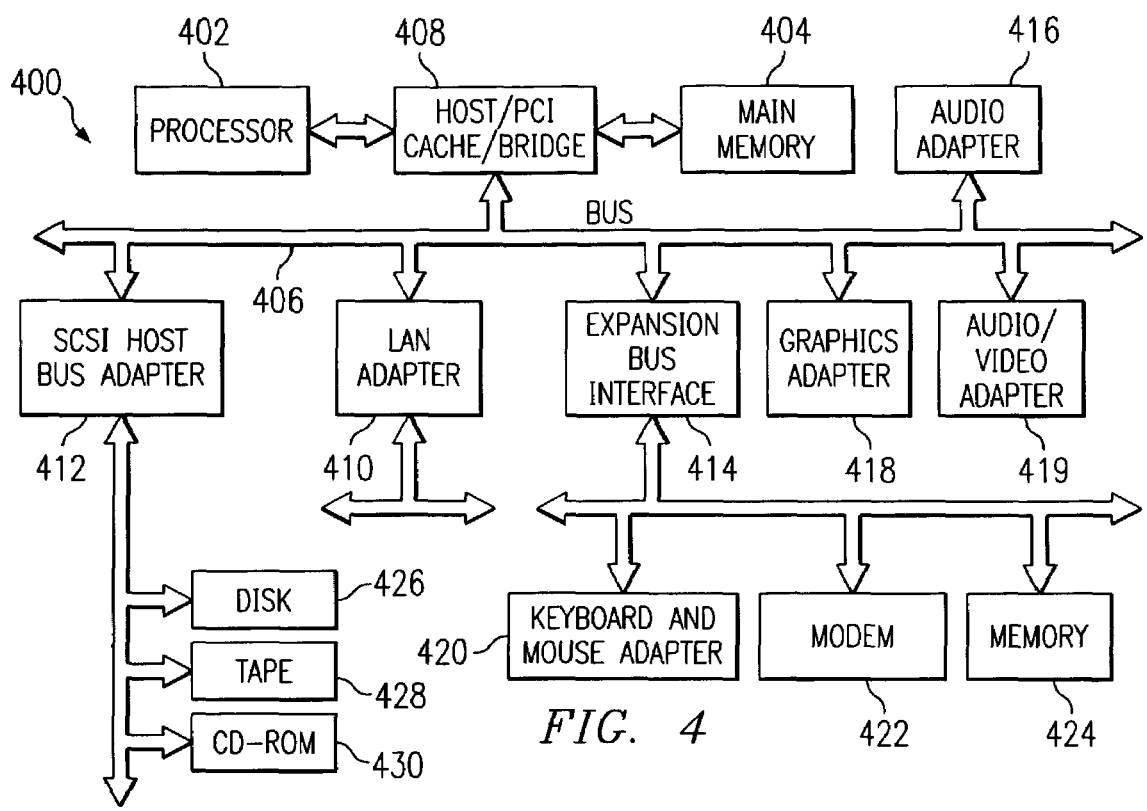
FIG. 4 is an exemplary block diagram of an endpoint device.

FIG. 4 is an exemplary block diagram of an endpoint device. Data processing system 400 is an example of a client computer. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in boards.

In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. Small computer system interface (SCSI) host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation. An object oriented programming system such as Java may run in conjunction with the operating system and provide calls to the operating system from Java programs or applications executing on data processing system 400. "Java" is a trademark of Sun Microsystems, Inc. Instructions for the operating system, the object-oriented operating system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

As another example, data processing system 400 may be a stand-alone system configured to be bootable without relying on some type of network communication interfaces As a further example, data processing system 400 may be a personal digital assistant (PDA) device, which is configured with ROM and/or flash ROM in order to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

Figure 5:
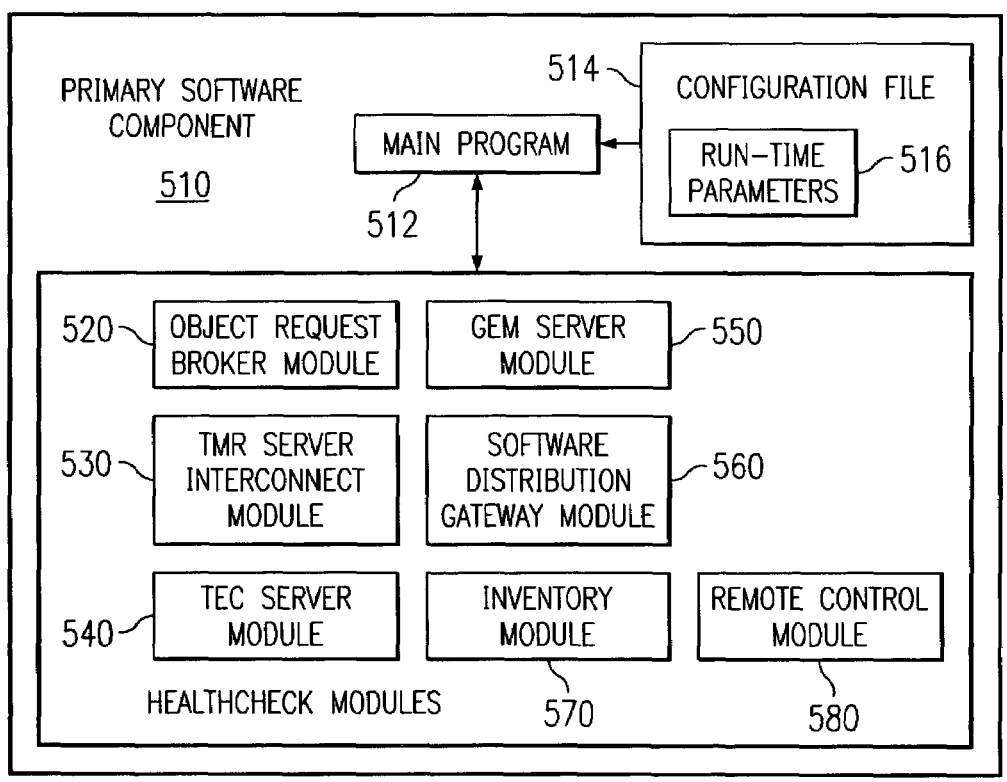
FIG. 5 is an exemplary diagram illustrating the primary components of a health monitoring agent in accordance with the present invention.

With the present invention, as shown in FIG. 5, a primary software component 510 is first installed on the TMR server. The TMR server creates a Software Distribution (SWD) filepackage and profile that is used to distribute and install the primary software component 510 on selected managed nodes in a Tivoli Management Region (TMR). For example, the TMR server may pass the profile to the Tivoli software distribution (SWD) TME component which then facilitates the installation of the primary software component 510 on the managed nodes using the SWD filepackage. This primary software component acts as a health monitoring agent on each of the managed nodes. The primary software component resident on the TMR server controls the operation of the health monitoring agents on each of the managed nodes.

The SWD includes an after-script which, in part, checks to see which TMR components are installed on a particular managed node and then enables those healthcheck modules 520–590. In this way, the primary software component 510 is configured on each of the managed nodes so that appropriate healthcheck modules 520–590 of the primary software component 510 monitor the TME components resident on the managed node and may report error events to the TEC and/or generate log files.

The primary software component 510 is comprised of two parts, a main program 512 and a configuration file 514. The main program, herein referred to as healthcheck.pl, creates a time stamp string, controls the execution of the various healthcheck modules, and sends TEC events based on the return code from each healthcheck module. The configuration file 514, hereafter referred to as healthcheck.config, contains run-time parameters 516 for healthcheck.pl and its healthcheck modules. Examples of these run-time parameters 516 and their corresponding descriptions are provided in Table 1 below.

TABLE 1

Configuration File Run-Time Parameters

| Parameters | Default Values | Description |
| --- | --- | --- |
| Max_Logsize | 20 | This is the number of lines of text maintained in a log file before the program automatically trims the size. This value should be no smaller than 10. The upper bound should be limited by disk space, but the main program reads TEC event information reported by the modules from these log files. If the file is large, it will take longer to process events. |
| Wait_On_Tivoli | YES | This value controls the healthcheck main program operation while wchkdb, wbkupdb, or winstall command is running. Set this value to NO to continue testing during execution of those commands. Set this value to YES to halt healthcheck testing during those operations. |

TABLE 1-continued

Configuration File Run-Time Parameters

| Parameters | Default Values | Description |
|---|---|---|
| Debug | 0 | This value informs the main program to either print (1) the debug information or not print (0) the debug information. |
| Primary_TEC | None | This value must be set to the IP host name of a TEC server. All events are posted using the postemsg command. |
| Secondary_TEC | None | This is an optional value, if used, should be set to the IP hostname of a second TEC server. This value is used if the primary server is unavailable. |
| Max_Wait | 35 | This value is used by the program to determine how long certain checks, such as ping, should run before the command times out. |
| Test_EP | None | This value is set of the healthcheck module for Endpoint Gateway is enabled on the TMR server. This value should be a label for an endpoint that can be migrated from one server to another to test the availability of the Endpoint Gateway. If the healthcheck module for Endpoint Gateway is enabled and this value is not defined, an error will be generated. The test endpoint defined for this value should be an endpoint contained within the TMR being tested. For example, if a test endpoint is logged onto an endpoint gateway in another TMR, the Endpoint Gateway module will fail. |
| TEC_Wait | 10 | This value is used by the TEC server monitor module. The module sends a HARMLESS TEC event that triggers a TEC rule to create a temporary file on the TEC host server. The program then waits n seconds, where n is the value specified for TEC_Wait, before verifying that the temporary file was created. If this value is set too low, a heavily loaded TEC server might not be able to create the file before file verification is made, thus creating a false event. If the value is set too high, unnecessary processing time for the module is spent. |
| GEM_Wait | 3 | This value is used by the healthcheck module for GEM server. The module issues the command tserver utility –s to dump semaphore information to the message log, which is then parsed for status information. The GEM_Wait parameter is used as the number of seconds the module waits before parsing the message log. This value, in minutes, is used to create a time range around the current time (for example, current time plus or minus the GEM_Time_Window value). Once this range has been determined, the healthcheck module for GEM server will use this value to determine which entries in the log file should contain server status information. For example, if the current time is 12:05 and the GEM_Time_Window parameter is set to 5, any event entry in the log file between 12:00 and 12:10 will be tested for server information. This value should not be set to 0. |
| GEM_Time_Window | 5 | This value, in minutes, is used to create a time range around the current time (for example, current time plus or minus the GEM_Time_Window value). Once this range has been determined, the healthcheck module for GEM server uses this value to determine which entries in the log file should contain server status information. For example, if the current time is 12:05 and the GEM_Time_Window parameter is set to 5, any event entry in the ihsmessage.log file between 12:00 and 12:10 will be tested for server status information. This value should not he set to 0. |
| RC_Test_Node | None | This value should be the name of a managed node or an endpoint device that will be used to support a remote command-line session from the healthcheck module for Remote Control. This value must be configured to monitor the health of Remote Control servers. |
| RC_Resource_Name | None | This is the name of the Remote Control management object that controls the RC_Test_Node parameter. This value must be configured to monitor the health of Remote Control servers. |

When the healthcheck.pl main program is run, it first checks to see if the configuration file healthcheck.config exists. If the configuration file does exist, the program then reads the values stored in the healthcheck.config file and checks to see if the following commands are running: wchkdb, wbkupdb and winstall. Depending on the value of the Wait_On_Tivoli variable in the healthcheck.config file, the program will either exit (if these commands are not determined to be running within the Wait_on_Tivoli wait time) or continue with the health checks (if these commands are determined to be running within the Wait_on_Tivoli wait time). The program then begins to process the separate healthcheck modules, starting with the object request broker healthcheck module.

The healthcheck modules form the core of the healthcheck program on the managed nodes. Each healthcheck module is written to monitor the health of one or more major TME components and report any errors it encounters to a TEC server and/or log the errors in a log file. The healthcheck modules are run sequentially in numerical order. Healthcheck modules are only enabled if the TME component is installed on that particular managed node. This is determined at the time the healthcheck main program is distributed and installed on the managed node using Software Distribution (SWD). A detailed description of each of the healthcheck modules used in the exemplary preferred embodiment is provided below.

The first healthcheck module utilized by the present invention is the healthcheck module that checks the health of the object request broker, e.g., oserv. This module, hc_100.mn, is run every time a managed node healthcheck is done. If the managed node is down, no additional healthcheck modules are processed. This module first checks to see if the oserv process, i.e. the object request broker process, is present in a system process table. Typically, all operating systems allow information about the processes running on the system to be obtained through the entry of a corresponding command. For example, in a UNIX based system, the command 'ps -ef' may be used to obtain process statistics. This command would list the processes running on the system and their details, including process name. Therefore, in order to know if the 'oserv' process, which is a Tivoli process, is running, a 'ps' command may be issued to see if the oserv process name is in the output generated by this command.

If the oserv process is not in the table, the module sends an error to a predefined TEC server. If the module determines that the oserv process is being run on a TMR server, the module will attempt to restart the oserv process. If the oserv process is in the table, the module does an object call to the oserv database to determine if oserv can process data requests. If it cannot, an error event is sent to a predefined TEC server and the program exists immediately. This module is run on all managed nodes on which it is installed. The module cannot be disabled or the healthcheck main program will not run on that managed node.

The second healthcheck module is the module for checking the interconnection of TMR servers. This module, hc_101.tmr, checks for interconnected TMR servers and, if it finds a 2-way connection or a down-stream TMR server, the hc_101.tmr module pings the other TMR server to test the network connectivity. If connectivity is good, the module then attempts to "idlcall" the remote TMR server to get the system's time and validate oserv-to-oserv communications. "Idlcall" is a known Tivoli call that provides a method of invoking Interface Definition Language (IDL) operations from the shell command line. If either of these checks fail, an error event is sent to a predefined TEC server. This module also checks for the existence of the "ep_mgr" process to determine if the Endpoint Manager is functioning on the TMR server. The "ep_mgr" process is a known Tivoli process. More information on this, and other known Tivoli processes, may be found at the Tivoli web site previously referenced above.

If the ep_mgr process is found, the module issues the command wep ls to verify that the Endpoint Manager is functioning. This module is run only on a TMR server. It cannot be enabled on any other managed node. The third healthcheck module, hc_102.tec, is a module that monitors the operational status of the TEC server. This module checks to see if the tec_server process exists in the a system process table. If the process does not exist, an error event is sent to a predefined TEC server. If the module determines that the tec_server process is being run on the TEC server defined by the Primary_TEC parameter in the healthcheck configuration file, the module will attempt to send the event to the TEC server defined by the Secondary_TEC parameter. If a Secondary_TEC parameter is not defined, the module will write to the log file and exit immediately. If the tec_server process exists, a HARMLESS event is sent to the TEC server being tested. This event class triggers a TEC rule to create a file in the /tmp directory of the TEC server. The module waits n seconds, where n is the value specified for TEC_Wait, before verifying that the temporary file was created. If the file exists, TEC is reported to be working. If the file does not exist, an error event is sent to another TEC server. If the GEM Enablement software is installed on the TEC server, the module will check for the existence of the GEM Enablement process. This module is run only on a TEC server and cannot be enabled on any other managed mode.

The fourth healthcheck module, hc_104.gem, is a module that runs on the TEC server and monitors the operational status of the Tivoli Global Enterprise Manager server by first checking for the existence of two process, ihsx and ihsctp, in the system process table. If one or both of these processes are missing, the server cannot function and a CRITICAL event will be sent to the server defined by the Primary_TEC parameter. If the primary server is not receiving events, an event will be sent to the server defined by the Secondary_TEC parameter, it exists. If both processes exist, the next check is initiated by issuing the tserver utility -s command. This command dumps server semaphore information that can be reviewed in the file $BINDIR/TDS/server/log/ihsmessage.log. Once this command is issued, the module waits n seconds, where n is the value specified for GEM_Wait, before parsing the ihsmessage.log file. The module looks for three event messages that correspond to the following events: client_db_event, view_db_event, and res_db_event. These events must have occurred within a time window defined by the current time plus or minus the value defined for the GEM_Time_Window parameter. If all three events are not found within the defined time window and are not listed as "currently free", a CRITICAL event will be sent to indicate a problem with the GEM server. This module is run only on a managed node running the GEM server software. It cannot be enabled on any other managed node.

The fifth healthcheck module, hc_105.swd, is a module that runs on any managed node with the Software Distribution Gateway installed. This module distributes a predefined filepackage (defined by the installer of healthcheck main program), containing four dummy files in the /tmp directory on managed nodes. The module then searches the appropriate temporary directory for each of the four files. If any file is not found, an event is sent to the TEC server. This module runs on any managed node with the Software Distribution of Software Distribution Gateway software installed and cannot be enabled on any other managed node.

The sixth healthcheck module, hc_106.inv, is a module that runs on any managed node with the Inventory or Inventory Gateway TME component installed. With this module, a temporary filename is first created using the current time stamp value. Next, a predefined Inventory profile is distributed to the managed node being tested. The Inventory profile scans the Healthcheck directories, including the newly created dummy file. The profile is defined to scan and enter the scanned information into the Inventory repository. The module then queries the repository, looking for the temporary file containing the current file stamp. If the temporary file is not found, an event is sent to the TEC server. This module is run on any managed node with the Inventory or Inventory Gateway software installed. It cannot be enabled on any other managed node.

The seventh healthcheck module, hc_107.rc, is a module that runs on the TMR server and monitors the operational status of the Tivoli Remote Control (TRC) TME component on one or more of the managed nodes. This module checks the TRC server by initiating a command-line session with a user-defined target PC and by issuing a set command on the remote PC. The program then searches the output of the command for any line containing the string "PATH=". If none is found, a CRITICAL event is issued to indicate a problem either on the server or target node. If the RC_Test_Node and RC_Resource_Name parameters are not defined within the healthcheck.config file, a WARNING event is sent to the TEC server. The PC defined by the RC_Test_Node parameter should be a PC that would normally remain running twenty-four hours a day. This module is run only on a TMR server and cannot be enabled on any other managed node.

These modules are part of the healthcheck main program which is first installed on the TMR server and then distributed, installed, and configured on each of the managed nodes in the TMR using the Software Distribution component of the TME. In order to install the healthcheck main program, one or more installation scripts are used to perform version checks, configuration file parameter value checks, and the like. These scripts may further prompt the human system administrator for inputs regarding various TMR information including, for example:

an installation directory;

policy region name of the policy region containing the profile manager that uses the Software Distribution filepackage profile to install the healthcheck main program;

profile manager name that contains the Software Distribution filepackage profile used to install the healthcheck main program;

the name of the profile used to install the healthcheck main program;

the name of the task library where all of the healthcheck maintenance tasks will be created;

policy region name that contains the task library;

whether to automatically schedule the healthcheck program at specified dates and times;

a run interval for the healthcheck main program;

the name of the policy region that contains the Software Distribution filepackage profile used by the Software Distribution healthcheck module hc_105.swd;

the name of the Software Distribution filepackage profile used by the Software Distribution healthcheck module hc_105.swd;

the name of the policy region that contains the Inventory profile used by the Inventory healthcheck module hc_106.inv;

the name of the profile manager that contains the healthcheck inventor profile used by the inventory healthcheck module hc_106.inv;

the name of the Inventory profile used by the Inventory healthcheck module hc_106.inv;

the name of the policy region that contains the query used by the Inventory healthcheck module hc_106.inv to verify that certain files were properly scanned and delivered to the Tivoli Inventory repository;

the name of the profile manager that contains the healthcheck Inventory query library used by the Inventory healthcheck module hc_106.inv;

the name of the query library where the healthcheck inventory query will be created; and the name of the Inventory query used by the Inventory healthcheck module hc_106.inv.

These profiles and profile names referenced above are created at the time of running the installation script. If no profile name is given, then a default profile name and profile may be used. One of ordinary skill in the art, having knowledge of Tivoli TME products, is capable of setting up profiles and profile names which may then be used by the present invention.

After all configuration file parameters are set, or their default values are kept, and necessary information is obtained from the human administrator, the installation scripts create the necessary profile managers, the managed node containing the necessary files for execution, and the Software Distribution filepackage profile used to distribute and install the healthcheck main program on the managed nodes. A distribution list may then be generated so that healthcheck main program is installed on all of the managed nodes in the distribution list.

After the healthcheck main program is distributed to the managed nodes, the installation scripts determine the TME components that are installed on the managed nodes. The script then enables only those healthcheck modules in the healthcheck main program that are used with the TME components installed on the particular managed node.

The installation scripts then set up the log files for the healthcheck modules enabled on the particular managed nodes. The log files are created with the values of the configuration file parameters Debug and Max_Logsize controlling the amount of historical information that is maintained in the log. Each entry in the log file is preceded by the time stamp string generated by the healthcheck main program on the TMR server, which is unique to each run of the healthcheck main program. The format of this string is:

LocalJulianDate,LocalTime,GreenwichJulianDate,
GreenwichMeanTime

Thus, the log files can contain information for several runs of the healthcheck main program that are delineated by the timestamp information above.

When a healthcheck module encounters error event conditions, it will write the event information to its log file. The event string, in a preferred embodiment, is a comma-delimited string that contains the following fields:

Timestamp_string—this is a string generated by the healthcheck main program on the TMR server each time the healthcheck program is executed;

HC_Event—this is a flag to the healthcheck main program indicating an event string. This string must always be present if the event is to be processed and sent;

Event_Severity—This string corresponds to the TEC severity levels (HARMLESS, WARNING, CRITICAL, and FATAL) and must always be in uppercase. This TEC severity level is the TEC severity level to which the incident severity level maps to;

Message_String—This string corresponds to the -m option in "postemsg" (postemsg is a known program in both the UNIX and Microsoft Windows environments);

Event_Attributes—This string corresponds to attribute=value pairs used to send events via "postemsg". There can be zero or more fields for this field. These values will be passed to the postemsg command;

Event_Class—the definition of a type of TEC event, including the set of attributes belonging to all events of the specified class. A class name is used to label an event by the event adapter. Event adapter is a process that translates external event information into a TEC event. Users can write their own event adapters using the TME 10 Event Integration Facility. The various event classes that are used with the exemplary embodiment of the present invention are shown in Table 2. Other classes may be used or defined in addition to or in replacement of one or more of the classes shown in Table 2 without departing from the spirit and scope of the present invention.

As an example of an event log, assume the hc_100.mn module determined that the oserv TME component was down at 4:50 AM, Jan. 30, 2000 EST. The event string, according to the present invention, should look similar to the following:

0302000,04:50,0302000,10:50,HC_EVENT,CRITI-
CAL,oserv down on skippy,hostname=skippy,
hc_oserv_down

TABLE 2

Error Event Sub-Classes and Leaf-Classes

| Sub-class | Leaf-Class |
|---|---|
| hc_main_events This corresponds to events occurring in or related to the healthcheck main program This program primarily handles syntax and configuration issues. | hc_general_failure This is the only leaf class in this sub-class and is used to denote an event related to some administrative error. For example, if a primary TEC server is not defined in the healthcheck config file, an hc_general_failure will be generated. This event can range from Harmless to Critical |
| hc_managed_node_events All leaf classes related to this sub-class occur during the execution of the managed node healthcheck module hc_100.mn | hc_oserv_down This event occurs if the oserv process is not found or an object call to the local oserv fails. This event is always reported as Critical |
| | hc_ep_mgr_down This event occurs if either the ep_mgr_process is missing from the system process table or if the program is unable to get a listing of endpoints via the wep ls command This event is always sent as Critical. |
| | hc_oserv_restart This event occurs when the hc_100 mn healthcheck module detects an oserv malfunction on a TMR server and an attempt is made to restart the oserv This event is always sent as a Warning |
| hc_tmr_events All leaf classes related to this sub-class occur during the execution of the TMR healthcheck module hc_101.tmr | hc_tmr_ping_failed This event occurs when the module is unable to properly ping a remote TMR server This event is always sent as Critical and includes the name of the remote TMR in the message filed of the event |
| | hc_tmr_idlcall_failed This event occurs when the module is unable to determine the remote TMR's time via an idlcall. This event is always sent as Critical and includes the name of the remote TMR in the message field of the event. |
| | hc_tmr_tnr_lookup_failed This event occurs when the module is unable to retrieve the remote TMR object ID (OID) via the remote TMR Name Registry. This event does not necessarily mean that the remote TMR oserv is not functioning It may be that the remote Name Registry is heavily loaded at the time the request is made. This event is always sent as a Warning |
| hc_gw_events All leaf classes related to this sub-class occur during the execution of the Endpoint Gateway healthcheck module hc_103 gw. | hc_gateway_unavailable This event occurs whenever an endpoint gateway is not responding to migration of a test endpoint or when a gateway restart request fails This event is always sent as Critical |
| | hc_gateway_restart This event occurs when the module attempts to restart a gateway that the module considers malfunctioning. This event is always sent as a Warning. |
| hc_gem_events All leaf classes related to this sub-class occur during the execution of the GEM healthcheck module hc_104 gem | hc_gem_server_down This event occurs when the module detects that either the GEM server processes are not present in the system process table or if certain status messages are not found in the GEM server message log. This event is always sent as Critical |
| hc_tec_events All leaf classes in this sub-class occur during the execution of the TEC healthcheck module hc_102 tec | hc_tec_heartbeat_open This event is sent to the TEC server being tested to trigger the creation of a heartbeat file in the /tmp directory This event is always sent as Harmless |
| | hc_tec_heartbeat_close This event occurs when the module detects that the TEC server has successfully created the heartbeat file in the /tmp directory This event is always sent as Harmless. |
| | hc_tec_server_down This event occurs when either the process tec_server is not found in the system process table or if the heartbeat file is not found in the /tmp directory after a tec_heartbeat_open event is sent to the TEC server. This event is always sent as Critical |
| | hc_gem_enablement_down This event occurs when the GEM enablement process is not present in the system process table This check is only done on TEC servers with the GEM Enablement software installed. This event is always sent as Critical |
| hc_swd_events All leaf classes related to this sub-class occur during the execution of the Software Distribution healthcheck module hc_105.swd. | hc_swd_distribution_failed This event occurs when the module detects that the Software Distribution process failed. This event is always sent as Critical |
| | hc_swd_distribution_timed_out Due to heavily loaded TMR or network in some instances, this event occurs when the test distribution does not complete before the time defined by the Max_Wait parameter in the healthcheck config file Because the reason for the timeout does not necessarily indicate that a failure of software distribution has occurred, this event is always sent as a Warning If this event is received from a managed node on a regular basis, it might indicate that the value for the parameter Max_Wait needs to be increased |
| hc_inv_events All leaf classes related to this sub-class occur during the execution fo the Inventory healthcheck module hc_106 inv | hc_inventory_scan_failure This event occurs when the healthcheck scan fails either while scanning the healthcheck directories or when trying to write the results to the Inventory repository. This event is always sent as Critical |
| | hc_inventory_read_failure This event occurs when the wgetinvdata command fails while attempting to read from the Inventory repository This event is always sent as Critical |
| hc_rc_events All leaf classes related to this sub-class occur during the execution of the Remote Control healthcheck module hc_107 rc | hc_remote_control_failure This event occurs when the Remote Control healthcheck module is unable to communicate with the test PC defined in the healthcheck config file. It may be due to the Remote Control server software not functioning properly, the test PC being down, or thenetwork link between the server and the test PC being down This event is always sent as Critical |
| | hc_rc_test_node_undefined This event occurs when the Remote Control healthcheck module is run without a test PC defined in the healthcheck config file. The module requires a test PC with the Remote Control target software installed |

TABLE 2-continued

Error Event Sub-Classes and Leaf-Classes

| Sub-class | Leaf-Class |
|---|---|
| | to function This event is always sent as a Warning |
| | hc_rc_resource_name_undefined This event occurs when the Remote Control healthcheck module is run without a Remote Control resource name that controls the test PC defined in the healthcheck config file The module requires this resource name to function This event is always sent as a Warning. |

Thus, whenever an error event occurs, the healthcheck module that identifies the error event creates a log entry in its corresponding log file. In addition, the healthcheck main program on the managed node may send a TEC event to the TEC server based on a return code from the healthcheck module. The return code may indicate (1) a normal condition, i.e. no errors found, (2) a Harmless or Warning event condition found, or (3) a Critical or Fatal event condition found. If the return code indicates either (2) or (3), an event may be sent to the TEC server which displays the event using the TEC component of the TME so that a human administrator is informed of the error event.

The TEC server is used to centralize event notification. With the present invention, two TEC servers may be identified in the configuration file such that TEC events are first sent to a primary TEC server, and if this fails, TEC events are sent to the secondary TEC server. If both TEC servers are unavailable, no further action is taken other than the writing of the log entry for the error event to the healthcheck module log file.

Thus, with the present invention, a health monitoring software agent is installed on a TMR server and is then distributed and installed on each of the managed nodes using the Software Distribution TME component. The health monitoring software agent on each of the managed nodes is then configured based on the particular TME components installed on the particular managed nodes. Thereafter, when the health monitoring software agent on the TMR server determines that the health of the system should be checked, it sends a start up event to the agents on each of the managed nodes. The agents then run each of their enabled healthcheck modules to determine the health of their system management components and the health of the TMR from their point of view. If an error occurs during the health check, the error is logged into a log file associated with the particular healthcheck module and the managed node. In addition, based on the return code returned from the healthcheck module, the health monitoring agent on the managed node may return an event to the TEC server in order to notify a system administrator of the error.

Figure 6:
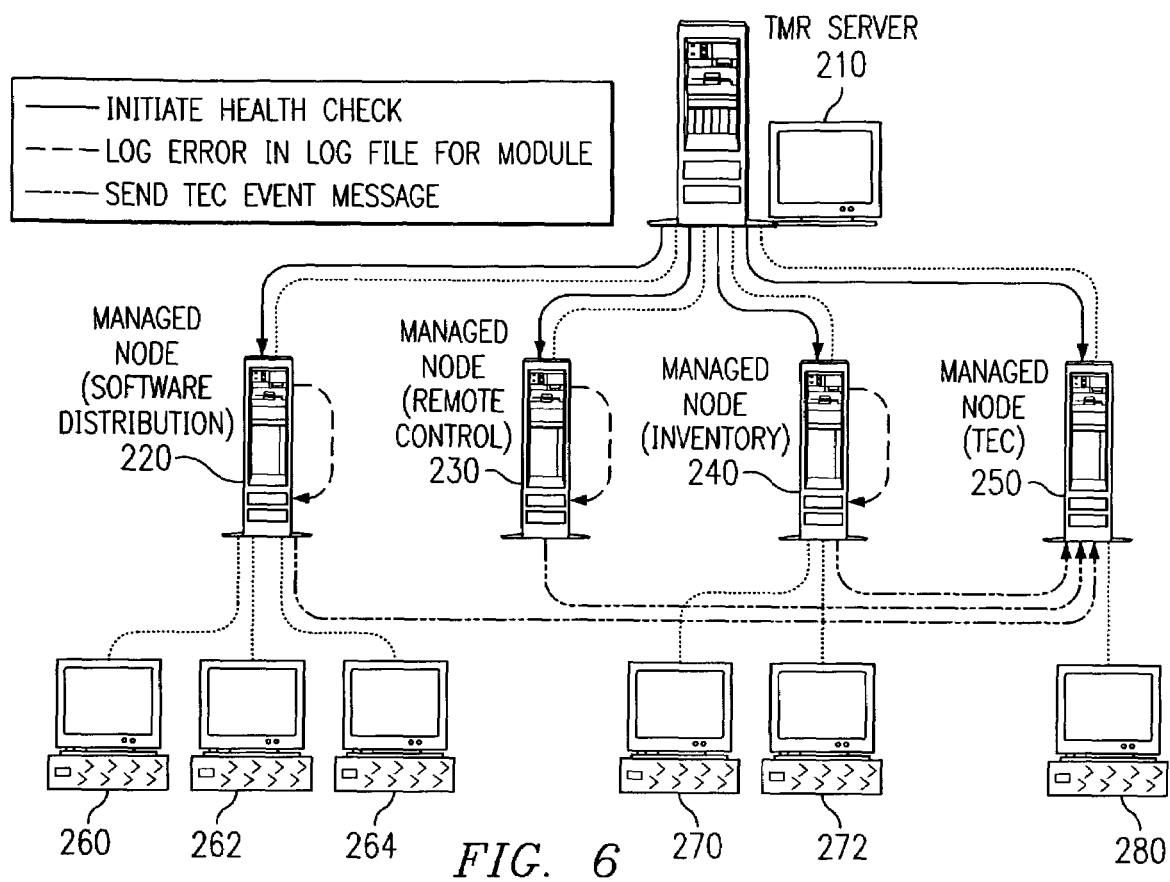
FIG. 6 is an exemplary diagram illustrating a message flow in accordance with the present invention.

FIG. 6 is an exemplary diagram illustrating a message flow in accordance with the present invention using the system of FIG. 2 as an example. As shown in FIG. 6, the TMR server 210 initiates a health check on each of the managed nodes 220–250. The managed node 220 runs the healthcheck module for checking software distribution, the managed node 230 runs the healthcheck module for checking the remote control function, the managed node 240 runs the healthcheck module for checking the inventory function, and the managed node 250 is a TEC server and runs the healthcheck module for checking the TEC server.

Assume that an error occurs during the running of the healthcheck modules on managed nodes 220–240. These errors are logged on their respective managed nodes 220–240 in log files associated with the healthcheck modules. In addition, TEC error messages are sent to the TEC server 250. Thus, while the managed nodes 220–250 manage the resources on the endpoints 260–280, health monitoring agents, provided by the present invention, on the managed nodes 220–250 monitor the health of the system management software running on the managed nodes 220–250.

The above description illustrates how the present invention may be used to monitor health of system management software on managed nodes. The present invention also provides a mechanism for monitoring the health of endpoints in a distributed manner. The endpoint health monitoring mechanism of the present invention monitors an endpoint's ability to run distributed monitors (programs that reside in the endpoint and perform the tasks of monitoring resources/programs) and the ability to communicate with the endpoint's assigned gateway server. The endpoint health monitoring mechanism of the present invention is designed such that the TEC server is not used for monitoring the health of all of the endpoints. Rather, each gateway server runs an endpoint healthcheck engine that performs the functions of monitoring the health of the distributed monitors of the endpoints assigned to that gateway server. In this way, the processing burden is shifted from the TEC server and is distributed over the gateway servers.

The endpoint health monitoring mechanism of the present invention comprises a health monitoring engine on the gateway server and a health monitoring agent on each of the endpoints being monitored. In one embodiment, the endpoint health monitoring mechanism is implemented as a string script, such as a UNIX Sentry string script, configured to run at periodic times. The string script is a wrapper for the endpoint method hchkupcall, which is used to send an upcall back to the gateway server indicating that the endpoint is functioning correctly.

With the present invention, the wrapper string script passes a hostname variable inherited from the distributed monitoring engine of the gateway server to the endpoint method hchkupcall. The hostname variable is the 'hostname' of the endpoint. The endpoint already knows which gateway it is going to call-this information is in a configuration file and can be modified by the user. However, the gateway has to get the hostname of the endpoint so that it can use it to do subsequent healthcheck processing functions, described hereafter.

The hostname variable is then passed from the endpoint to the gateway server as part of the endpoint method upcall. The gateway server then passes the hostname to the health monitoring engine for processing. The health monitoring engine maintains a list of all endpoints that have checked in to the gateway along with the latest check in time. If an endpoint fails to check in within configurable time limits, an event will be sent to the TEC server.

Figure 7:
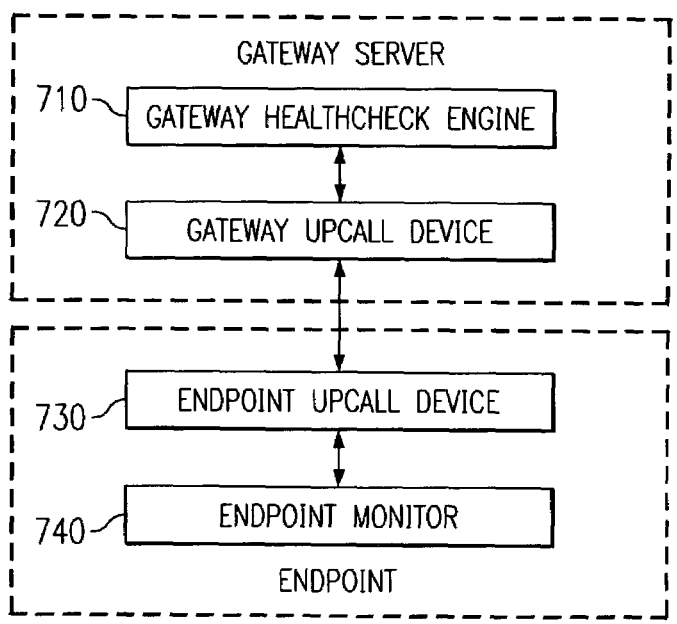
FIG. 7 is an exemplary block diagram of the primary operational components of a mechanism for distributed monitoring of endpoints in accordance with the present invention.

FIG. 7 is an exemplary diagram of a health monitoring mechanism for distributed monitoring of endpoints in accordance with the present invention. As shown in FIG. 7, the health monitoring mechanism is comprised of a gateway healthcheck engine 710, a gateway upcall device 720, an endpoint upcall device 730, and an endpoint monitor 740. While FIG. 7 depicts these elements as separated devices, these elements may be implemented as software instructions executed by one or more processors on the gateway server 750 and the endpoint 770.

The endpoint monitor 740 is used to initiate an upcall to the gateway server at predetermined time intervals. The endpoint monitor 740 invokes the endpoint upcall device 730 to send an upcall to the gateway server indicating the endpoint hostname. The gateway upcall device 720 receives the upcall from the endpoint and provides the upcall to the gateway healthcheck engine 710. Although, in a preferred embodiment, the upcall only contains an indicator of the endpoint hostname, the present invention is not limited to such and other information may be included in the upcall as deemed appropriate to the particular application of the present invention.

The gateway healthcheck engine 710 is not a registered TME method and will continue to run in the event the TMR gateway processes terminate. The gateway healthcheck engine runs continuously as a daemon process.

The endpoint hostname is received from the gateway upcall device 720. The gateway healthcheck engine 710 verifies that the endpoint from which the upcall was received is currently being monitored by the health monitoring mechanism. This may be done by comparing the endpoint hostname to a list of monitored endpoint hostnames. If the endpoint is currently being monitored by the health monitoring mechanism, the timestamp for the endpoint is updated to reflect the latest upcall from the endpoint. This is the last known time that the endpoint was indicated as being operational. If the endpoint is not currently being monitored by the health monitoring mechanism, the healthcheck engine 710 updates its list of monitored endpoints and sends a Harmless event to the TEC server, advising of the check in.

The gateway healthcheck engine 710 monitors the time stamp data of each endpoint in the list of monitored endpoints and sends an appropriate event to the TEC server if a problem is identified. Problems are identified by, for example, taking a difference between the last check in time stamp and a current time, and comparing this difference to various thresholds. A first threshold may indicate that a Warning level TEC event should be sent, a second threshold may indicate that a Critical level TEC event should be sent, and a third threshold may indicate that a Fatal level TEC event should be sent, for example.

A Warning level TEC event may be, for example, when an endpoint has not checked in within a predetermined period of time but that predetermined period of time may be within a "grace period" window in which the endpoint is allowed to miss a check in for various reasons. The Critical level TEC event may be, for example, when an endpoint has not check in within a predetermined period of time and there is no reason, other than an error in the operation of the endpoint, that the endpoint should not have checked in during that predetermined period of time. The Fatal level TEC event may be, for example, when the endpoint has not checked in a large period of time indicating a complete failure of the endpoint. If an endpoint fails, it is probable that each of the above TEC events will be sent to the TEC server as the endpoint fails to check in within the various predetermined periods of time.

Rather than waiting for a TEC event to be sent to the TEC server, an administrator of the TMR may obtain a current status of all of the endpoints for a gateway server or the TMR by entering a "display endpoint status" command into the command line of the TMR server via a workstation or the like. The administrator may then identify which endpoints for which status information is requested. In response, the TMR server obtains currents status information from each of the gateway servers, or only the gateway servers corresponding to the identified endpoints, and displays this information to the administrator. Such a display may include, for example, a hostname for the endpoint and a corresponding status code, such as 1 for normal, 2 for warning, 3 for critical, 4 for fatal.

The various predetermined time intervals and other parameters for the operation of the endpoint healthcheck engine 710 are defined in a configuration file associated with the endpoint healthcheck engine 710. Table 3 provides a description of some of these parameters used with the endpoint healthcheck engine 710. These parameters are configurable by the administrator via a workstation and are stored in a configuration file on the TEC server before being distributed to each gateway server as part of the installation of the gateway healthcheck mechanism of the present invention.

TABLE 3

Configuration Parameters for Gateway Healthcheck Engine

| Parameter | Default Setting | Description |
| --- | --- | --- |
| tec_server | None | By default, this parameter is not set. It is set to the correct TEC server during the initial TMR server setup |
| warn_time | 600 | This is the time in seconds that the Gateway Healthcheck engine waits before sending a WARNING level event to the TEC server. |
| crit_time | 720 | This is the time in seconds that the Gateway Healthcheck engine waits before sending a CRITICAL level event to the TEC server |
| fatal_time | 840 | This is the time in seconds that the Gateway Healthcheck engine waits before sending a FATAL event to the TEC server |
| event_time | 50 | This is the maximum number of events that the Gateway Healthcheck engine forwards to the TEC server within the event limit window. By default, the Gateway Healthcheck engine will not forward more than 50 events to the TEC server during a 5 minute window |
| event_limit_time | 300 | This is the time in seconds of the event limit window This parameter is used in conjunction with the event_time parameter |

Figure 8:
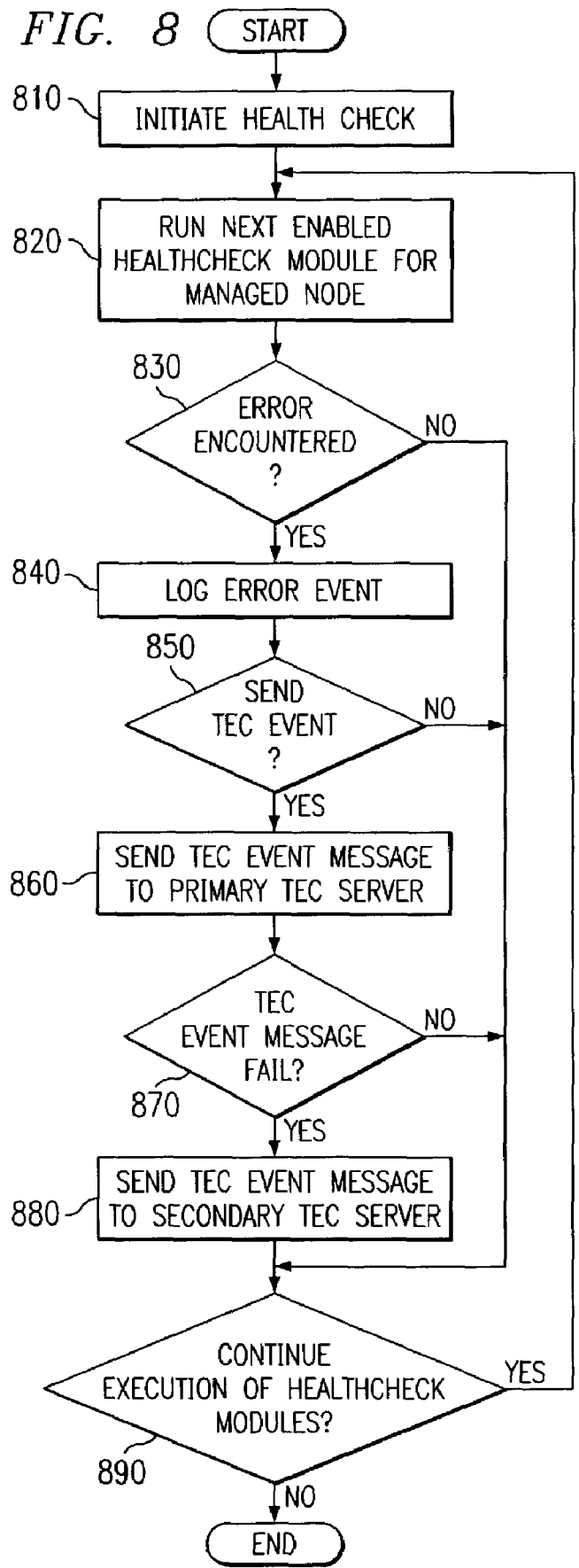
FIG. 8 is a flowchart outlining an exemplary operation of the present invention when performing health checks of components of a managed node.

FIG. 8 is a flowchart outlining an exemplary operation of the present invention when performing health checks of components of a managed node. As shown in FIG. 8, the operation starts with an initiation of a health check from the TMR server (step 810). An enabled healthcheck module is then run on the managed node (step 820). A determination is made as to whether an error was encountered (step 830). If so, the error event is logged (step 840) and a determination is made as to whether a TEC event is to be sent (step 850).

If a TEC event is to be sent, the TEC event message is sent to the primary TEC server (step 860). A determination is made as to whether the TEC event message failed (step 870). If so, the TEC event message is sent to a secondary TEC server (step 880).

Thereafter, or if a TEC event is not to be sent, a determination is made as to whether further execution of healthcheck modules is to continue (step 890). This may be based on whether or not a Critical error has occurred, whether more healthcheck modules are enabled, or the like. If more execution of healthcheck modules is to be done, the operation returns to step 820 where a next healthcheck module is run. Otherwise, the operation ends.

Figure 9:
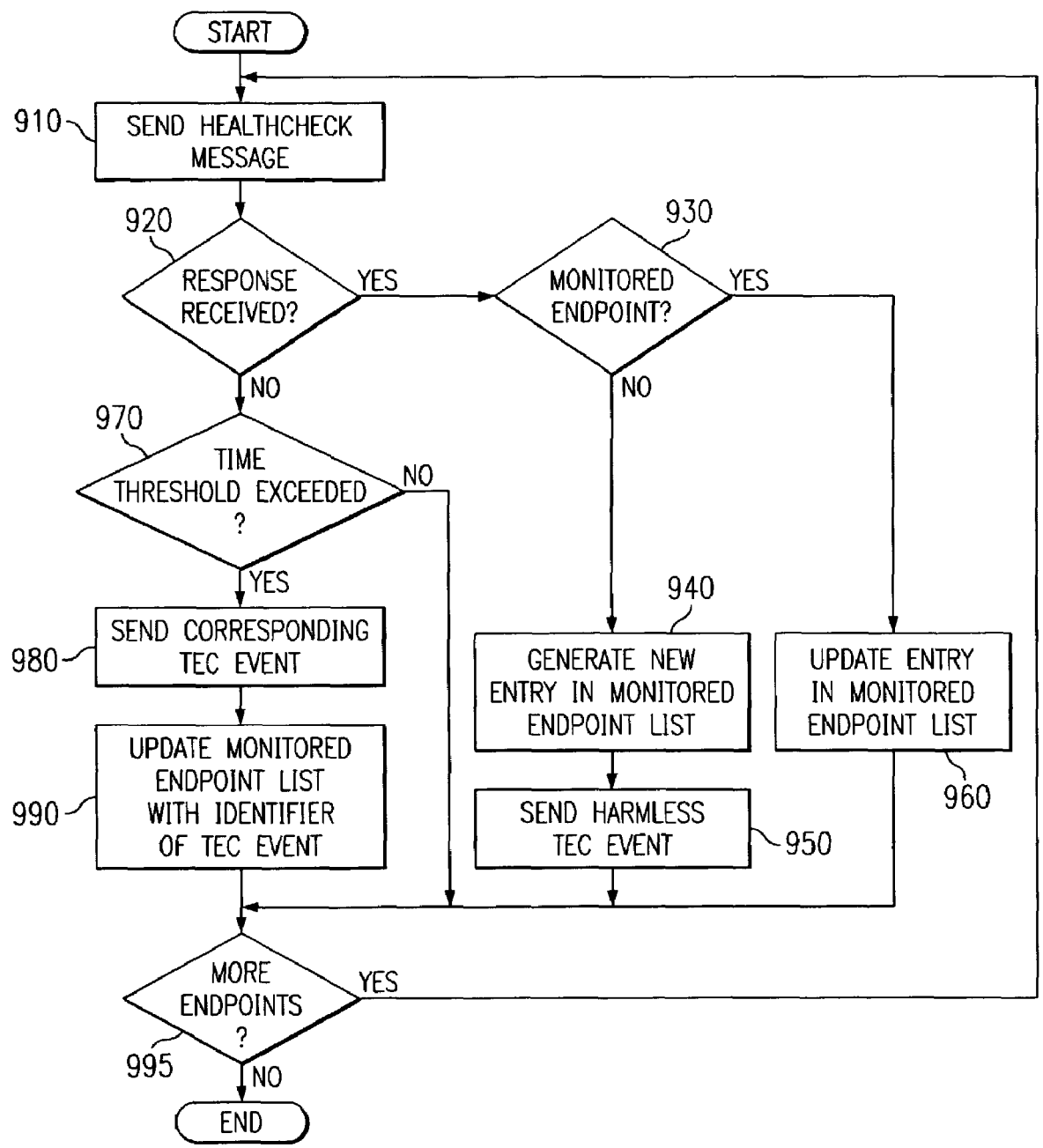
FIG. 9 is a flowchart outlining an exemplary operation of the present invention when performing health checks of components of an endpoint.

FIG. 9 is a flowchart outlining an exemplary operation of the present invention when performing health checks of distributed management of components of an endpoint. As shown in FIG. 9, the operation starts with a healthcheck message being sent to the endpoint from the gateway server (step 910). The healthcheck message includes a hostname variable. A determination is made as to whether the gateway server receives a response from endpoint (step 920). The response from the endpoint would include the hostname variable.

If a response is received from the endpoint, a determination is made as to whether this is a currently monitored endpoint (step 930). If not, a new entry in the list of monitored endpoints is created with a corresponding time stamp (step 940) and a harmless TEC event is sent to the TEC server (step 950). If the endpoint is a currently monitored endpoint, the endpoint's entry in the list of monitored endpoints is updated with the new time stamp of the received response (step 960).

If the endpoint does not respond, a determination is made as to whether a time threshold has been exceeded (step 970). If not, the operation goes to step 995, described hereafter. If a time threshold has been exceeded, a corresponding TEC event is sent to the TEC server (step 980) and the list of managed endpoints is updated with an identifier of the TEC event (step 990). A determination is made as to whether there are any more endpoints to be checked (step 995). If so, the operation returns to step 910 with a healthcheck message being sent to another endpoint being managed by the gateway server. If not, the operation ends. This operation may be repeated at periodic time intervals, on a continuous basis or the like.

Thus, in addition to providing healthcheck operations for managed nodes in a Tivoli Management Region, the present invention also provides a mechanism for monitoring the health of endpoints in a distributed manner. With this invention, the burden of monitoring the health of the endpoints is taken off of the TEC server and is distributed across the gateway servers and the individual endpoints. In this way, the health status of each endpoint may be identified and reported to a human administrator.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of monitoring health of endpoint devices in a Tivoli Management Region, comprising:
  distributing a health monitor to an endpoint device, the health monitor monitoring the endpoint device's resources;
  monitoring, by a Tivoli gateway server, an ability of the endpoint device to run the health monitor by;
  sending, from the Tivoli gateway server of the Tivoli Management Region, a response request to the endpoint device;
  determining if a response is received from the endpoint device, wherein the response is received, if the endpoint device is able to run the health monitor and the response is not received if the endpoint device is unable to run the health monitor; and
  updating an entry in a list of monitored endpoint devices based upon whether or not a response is received from the endpoint device.

2. The method of claim 1, wherein if it is determined that a response is received from the endpoint device, updating the entry in the list of monitored endpoint devices includes updating a time stamp in the list of monitored endpoint devices to be a time at which the response was received by the Tivoli gateway server.

3. The method of claim 1, wherein if it is determined that a response is not received from the endpoint device, the method further comprises:
  determining a time interval between a time stamp in an entry for the endpoint device in the list of monitored endpoint devices and a current time;
  determining if the time interval exceeds a predetermined threshold; and
  sending a notification if the time interval exceeds the predetermined threshold.

4. The method of claim 3, wherein the notification is a Tivoli Enterprise Console event.

5. The method of claim 4, wherein the predetermined threshold is one of a warning level threshold, a critical level threshold, and a fatal level threshold, and wherein the notification is one of a Warning level Tivoli Enterprise Console event, a Critical level Tivoli Enterprise Console event, and a Fatal level Tivoli Enterprise Console event.

6. The method of claim 1, wherein sending, from a Tivoli gateway server of the Tivoli Management Region, a response request to a endpoint device includes using a wrapper string script to pass a hostname variable to the endpoint device.

7. The method of claim 6, wherein the response is an upcall from the endpoint device that includes the hostname variable passed by the wrapper string script.

8. The method of claim 1, wherein updating an entry in a list of monitored endpoint devices based upon whether or not a response is received from the endpoint device includes:
  determining, based on a list of monitored endpoint devices, if the response is received from a currently monitored endpoint device; and
  if the response is not received from a currently monitored endpoint device;
  adding an entry for the endpoint device to the list of currently monitored endpoint devices, the entry including a time stamp corresponding to receipt of the response from the endpoint device.

9. The method of claim 1, further comprising:
   maintaining a list of currently monitored endpoint devices, wherein the list includes a hostname for each monitored endpoint device and a current status of each monitored endpoint device;
   receiving a request for current status information from a requester; and
   providing an output of the list to the requester, the output identifying each monitored endpoint device and the endpoint device's current status.

10. The method of claim 9, wherein the request for current status information includes an identification of one or more endpoint devices for which current status information is requested, and wherein providing output of the list to the request includes providing output identifying each monitored endpoint device that is included in the request, and the endpoint device's current status.

11. A computer program product in a computer readable medium for monitoring health of endpoint devices in a Tivoli Management Region, comprising:
   instructions for distributing a health monitor to an endpoint device, the health monitor monitoring the endpoint device's resources;
   instructions for monitoring, by a Tivoli gateway server, an ability of the endpoint device to run the health monitor by;
   first instructions for sending, from the Tivoli gateway server of the Tivoli Management Region, a response request to the endpoint device;
   second instructions for determining if a response is received front the endpoint device, wherein the response is received if the endpoint device is able to run the health monitor and the responses is not received if the endpoint device is unable to run the health monitor; and
   third instructions for updating an entry in a list of monitored endpoint devices based upon whether or not a response is received from the endpoint device.

12. The computer program product of claim 11, wherein the third instructions for updating the entry in the list of monitored endpoint devices includes instructions for updating a time stamp in the list of monitored endpoint devices to be a time at which the response was received by the Tivoli gateway saver, if it is determined that a response is received from the endpoint device.

13. The computer program product of claim 11, wherein if the second instructions determine that a response is not received from the endpoint device, the computer program product further comprises:
   fourth instructions for determining a time interval between a time stamp in an entry for the endpoint device in the list of monitored endpoint devices and a current time;
   fifth instructions for determining if the time interval exceeds a predetermined threshold; and
   sixth instructions for sending a notification if the time interval exceeds the predetermined threshold.

14. The computer program product of claim 13, wherein the notification is a Tivoli Enterprise Console event.

15. The computer program product of claim 14, wherein the predetermined threshold is one of a warning level threshold, a critical level threshold, and a fatal level threshold, and wherein the notification is one of a Warning level Tivoi Enterprise Console event, a Critical level Tivoli Enterprise Console event, and a Fatal level Tivoli Enterprise Console event.

16. The computer program product of claim 11, wherein the first instructions for sending, from a Tivoli gateway server of the Tivoli Management Region, a response request to a endpoint device include instructions for using a wrapper string script to pass a hostname variable to the endpoint device.

17. The computer program product of claim 16, wherein the response is an upcall from the endpoint device that includes the hostname variable passed by the wrapper string script.

18. The computer program product of claim 11, wherein the third instructions for updating an entry in a list of monitored endpoint devices based upon whether or not a response is received from the endpoint device include:
   instructions for determining, based on a list of monitored endpoint devices, if the response is received from a currently monitored endpoint device; and
   instructions for adding an entry for the endpoint device to the list of currently monitored endpoint devices, the entry including a time stamp corresponding to receipt of the response from the endpoint device, if the response is not received from a currently monitored endpoint device.

19. The computer program product of claim 11, further comprising:
   fourth instructions for maintaining a list of currently monitored endpoint devices, wherein the list includes a hostname for each monitored endpoint device and a current status of each monitored endpoint device;
   fifth instructions for receiving a request for current status information from a requester; and
   sixth instructions for providing an output of the list to the requester, the output identifying each monitored endpoint device and the endpoint device's current status.

20. The computer program product of claim 19, wherein the request for current status information includes an identification of one or more endpoint devices for which current status information is requested, and wherein the sixth instructions for providing output of the list to the request include instructions for providing output identifying each monitored endpoint device that is included in the request, and the endpoint device's current status.

21. An apparatus for monitoring health of endpoint devices in a Tivoli Management Region, comprising:
   means for distributing a health monitor to an endpoint device, the health monitor monitoring the endpoint device's resources:
   means for monitoring, by a Tivoli gateway server, an ability of the endpoint device to run the health monitor including:
   means for sending, from the Tivoli gateway server of the Tivoli Management Region, a response request to the endpoint device;
   means for determining if a response is received from the endpoint device, wherein the response is received if the endpoint device is able to run the health monitor and the response is not received if the endpoint device is unable to run the health monitor; and
   means for updating an entry in a list of monitored endpoint devices based upon whether or not a response is received from the endpoint device.

22. The apparatus of claim 21, wherein the means for updating the entry in the list of monitored endpoint devices includes means for updating a time stamp in the list of monitored endpoint devices to be a time at which the response was received by the Tivoli gateway server, if it is determined that a response is received from the endpoint device.

23. The apparatus of claim 21, the apparatus further comprises:

means for determining a time interval between a time stamp in an entry for the endpoint device in the list of monitored endpoint devices and a current time;

means for determining if the time interval exceeds a predetermined threshold; and means for sending a notification if the time interval exceeds the predetermined threshold.

24. The apparatus of claim 23, wherein the notification is a Tivoli Enterprise Console event.

25. The apparatus of claim 24, wherein the predetermined threshold is one of a warning level threshold, a critical level threshold, and a fatal level threshold, and wherein the notification is one of a Warning level Tivoli Enterprise Console event, a Critical level Tivoli Enterprise Console event, and a Fatal level Tivoli Enterprise Console event.

26. The apparatus of claim 21, wherein means for sending, from a Tivoli gateway server of the Tivoli Management Region, a response request to a endpoint device includes means for using a wrapper string script to pass a hostname variable to the endpoint device.

27. The apparatus of claim 26, wherein the response is an upcall from the endpoint device that includes the hostname variable passed by the wrapper string script.

28. The apparatus of claim 21, wherein the means for updating an entry in a list of monitored endpoint devices based upon whether or not a response is received from the endpoint device includes:

means for determining, based on a list of monitored endpoint devices, if the response is received from a currently monitored endpoint device; and means for adding an entry for the endpoint device to the list of currently monitored endpoint devices, the entry including a time stamp corresponding to receipt of the response from the endpoint device, if the response is not received from a currently monitored endpoint device.

29. The apparatus of claim 21, further comprising:

means for maintaining a list of currently monitored endpoint devices, wherein the list includes a hostname for each monitored endpoint device and a current status of each monitored endpoint device;

means for receiving a request for current status information from a requester; and means for providing an output of the list to the requester, the output identifying each monitored endpoint device and the endpoint device's current status.

30. The apparatus of claim 29, wherein the request for current status information includes an identification of one or more endpoint devices for which current status information is requested, and wherein the means for providing output of the list to the request includes means for providing output identifying each monitored endpoint device that is included in the request, end the endpoint device's current status.

* * * * *